Aug. 3, 1965   R. J. MILLER ETAL   3,198,030
ADJUSTABLE STEERING COLUMN

Filed July 20, 1961   3 Sheets-Sheet 1

INVENTORS
RAYMOND J. MILLER
W. ROBERT SMITH
BY

Peter F. Hilder

ATTORNEY

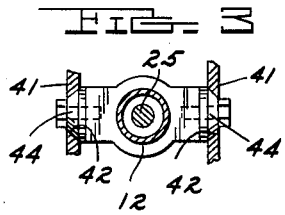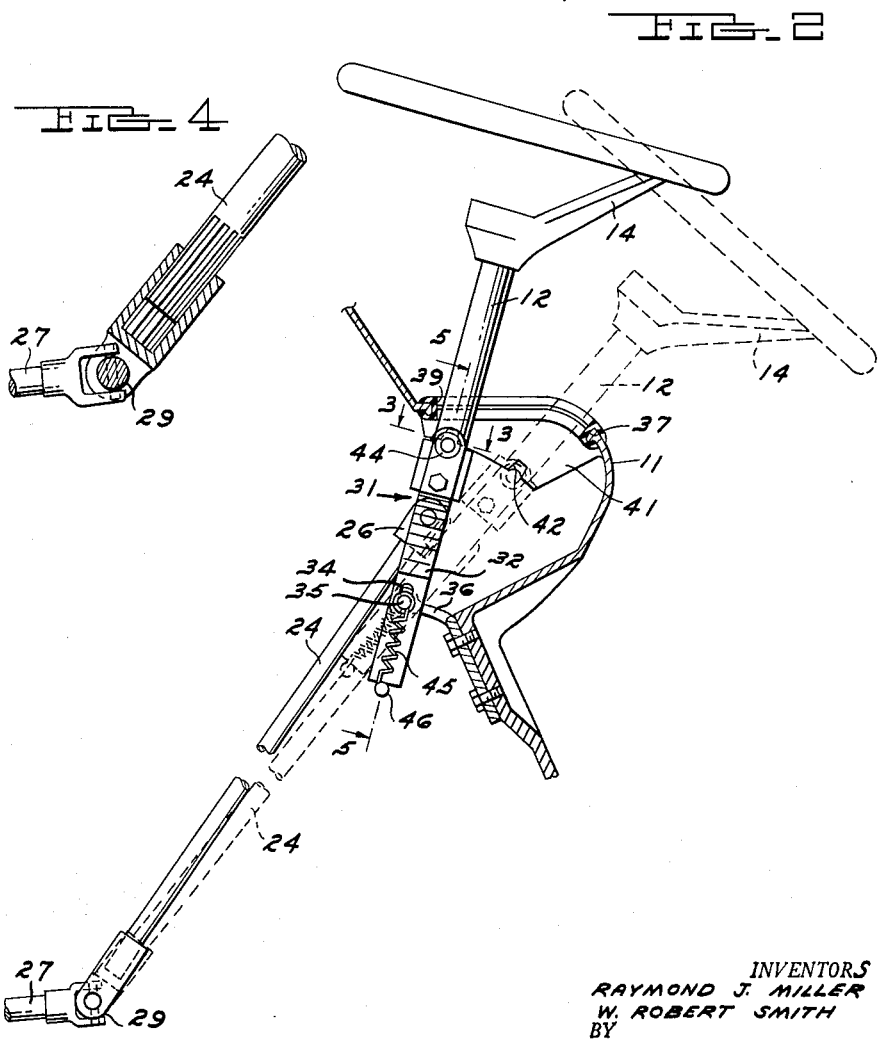

Aug. 3, 1965 R. J. MILLER ETAL 3,198,030
ADJUSTABLE STEERING COLUMN
Filed July 20, 1961 3 Sheets-Sheet 3
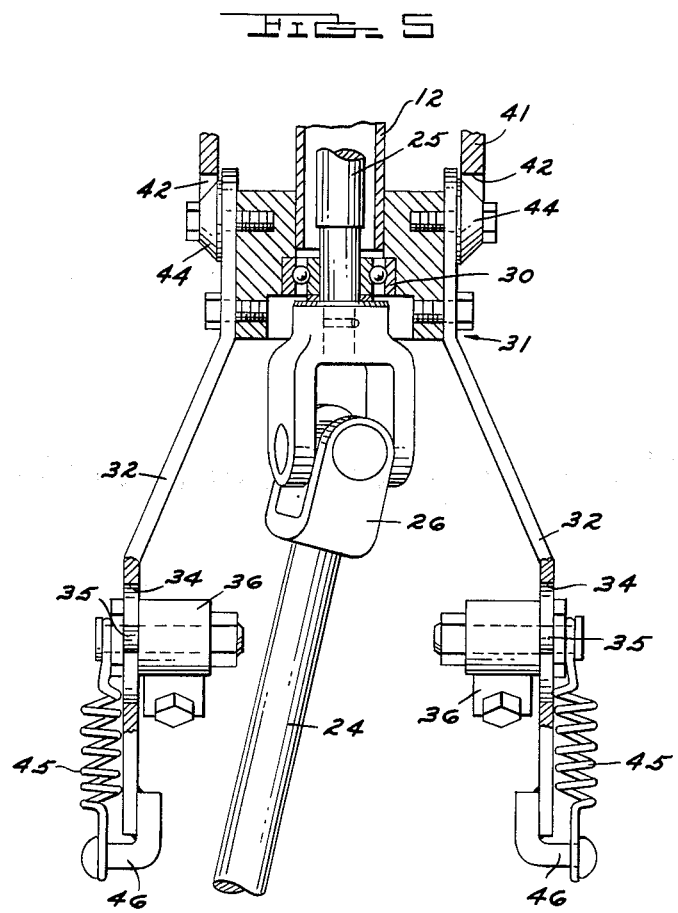
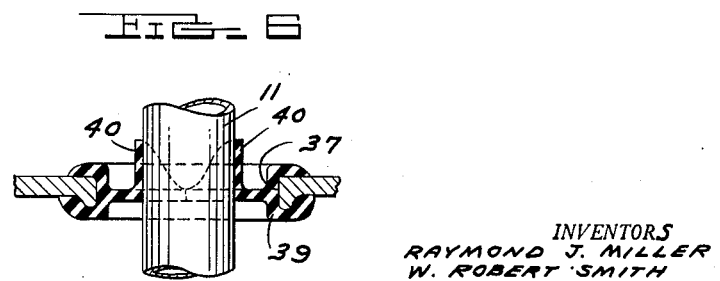
INVENTORS
RAYMOND J. MILLER
W. ROBERT SMITH
BY
*Peter F. Hilder*
ATTORNEY

United States Patent Office 3,198,030
Patented Aug. 3, 1965

3,198,030
ADJUSTABLE STEERING COLUMN
Raymond J. Miller, Detroit, and W. Robert Smith, Birmingham, Mich., assignors to Ford Motor Company, Dearborn, Mich., a corporation of Delaware
Filed July 20, 1961, Ser. No. 125,536
3 Claims. (Cl. 74—493)

This invention relates to adjustable steering columns for tractors.

Agricultural and industrial tractors are provided with operator's controls, customarily including a steering wheel and brake and clutch pedals for controlling the tractor. A seat also is provided from which the operator may conveniently reach the steering wheel and control pedals.

Tractors usually are operated from a sitting position, but it frequently is desirable for the driver to stand for better visibility, to rest muscles cramped from prolonged sitting, or to reduce the jarring impact on the driver when traversing rough ground. Accordingly, the steering wheel of most tractors is positioned as a compromise somewhere between the most desirable positions for sitting and standing operation.

According to the present invention, the upper portion of the steering column and steering wheel are adjustable in a vertical arc between two positions, a lower position of the steering wheel providing maximum comfort and convenience for sitting operation and an upper position providing the same for standing operation. The steering wheel locks automatically in each position and may be unlocked readily by movement of the wheel.

Among the objects of the present invention are to provide a tractor having a steering wheel and column adjustable between two locked positions to facilitate tractor operation from either sitting or standing position, to provide an improved construction facilitating such adjustment, and generally to improve devices of the type described.

Other objects, and objects relating to details of construction and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

FIGURE 2 is a side elevation of the steering column and associated parts at enlarged scale, the tractor cowl portion being shown in vertical section.

FIGURE 3 is an enlarged inclined section taken along the line 3—3 of FIGURE 2.

FIGURE 4 is an enlarged fragmentary elevation of the lower end portion of the steering column and universal joint, a portion of the universal joint being shown in axial section.

FIGURE 5 is an enlarged section taken along the line 5—5 of FIGURE 2, certain of the parts being shown in elevation.

FIGURE 6 is an enlarged fragmentary section taken on the line 6—6 of FIGURE 1, the steering column being shown in elevation.

Figure 1:
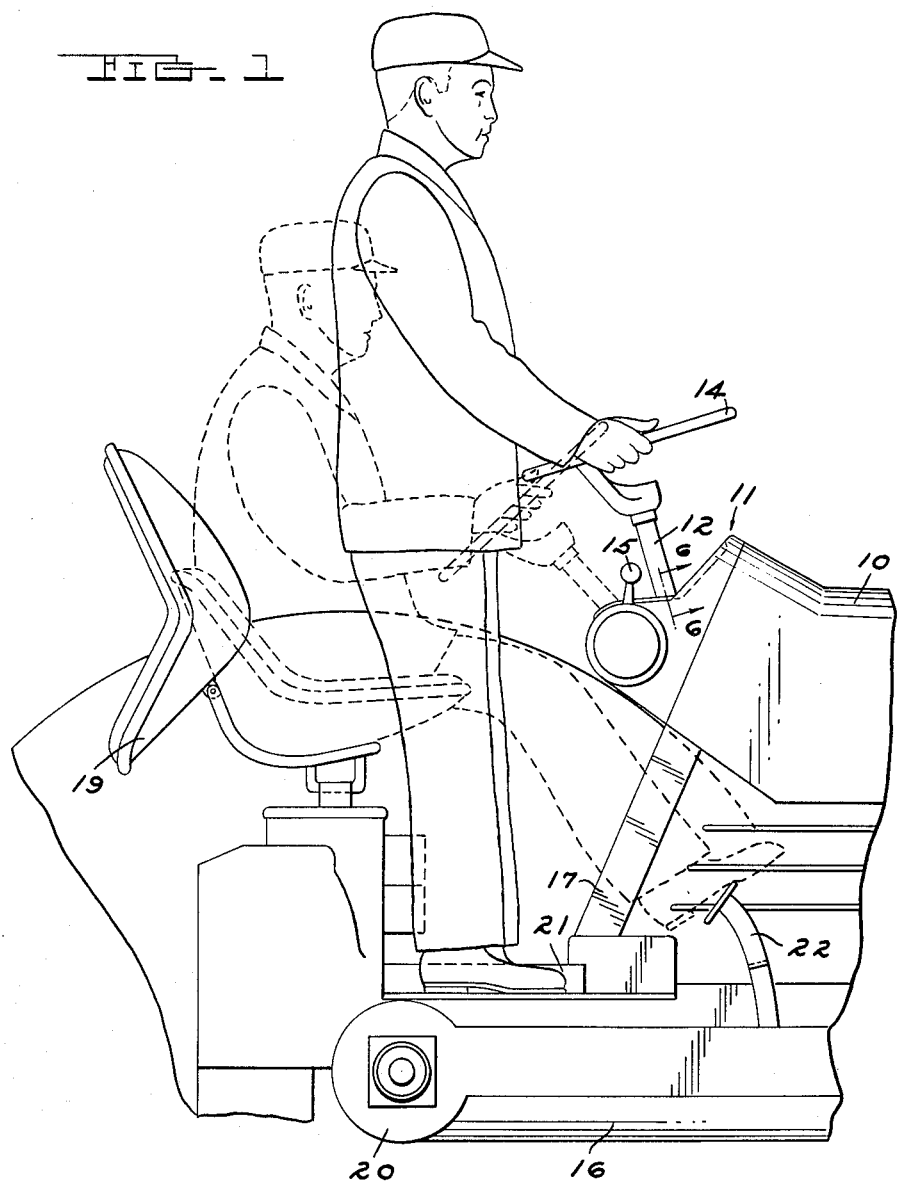
FIGURE 1 is a somewhat diagrammatic side elevation of the operator's station of a tractor according to the present invention, the steering column and steering wheel being shown in raised position in full line and being shown in lowered position in broken line, and the tractor operator being indicated.

Referring now to the drawings, the tractor of the present invention has a hood portion 10 terminating in a cowl portion 11 provided with the customary instruments, not shown, and also provided with a steering column, including a steering column housing 12, and a steering wheel 14. A throttle lever 15 may be provided at one side of the cowl. The cowl portion 11 is a part of the tractor body and may be supported from the transmission housing 16 of the tractor by uprights, one upright 17 being shown.

An operator's seat 19 is provided towards the rear of the tractor, the seat being generally over the rear axle housing 20. The seat 19 may be of the horizontally pivoted type, adapted to be swung back to the full line position shown in FIGURE 1 to facilitate operation of the tractor from a standing position. An operator's platform 21 is positioned immediately in front of the seat 19, the operator's platform being generally below the steering wheel 14 and control pedals being located at the forward end of the operator's platform for operating the clutch and brakes of the tractor, one control pedal 22 being shown.

According to the present invention, the steering column and steering wheel 14 is movable along a vertically extending arc between a rearward position, shown in broken line in FIGURE 1, in which the wheel is inclined at a greater angle to the horizontal and a forward position in which the wheel is raised and lies more nearly in a horizontal plane, the former position being well adapted for operation of the tractor from a sitting position and the latter for operation while standing.

Referring now to FIGURES 2–6, the tractor steering shaft is in at least two parts, a lower portion 24 and an upper portion 25, the two portions being interconnected by a universal joint 26 to permit the upper portion to swing with respect to the lower portion. The lower portion 24 of the steering shaft is connected with a forwardly extending shaft 27 of the steering linkage by a second universal joint 29, the joint 29 being splined and telescopically receiving the lower end of the portion 24 of the steering shaft. The shaft 27 operates a more or less conventional steering gear for steering the tractor.

The lower end of the upper portion 25 of the steering shaft is rotatably received within a bearing 30 mounted within a yoke 31 (FIGURE 5) to which the lower end of the steering column housing 12 is fixed. The yoke 31 is provided with two downwardly projecting leg portions 32, 32, the outer ends of these portions extending in spaced parallel relation. The parallel ends of the leg portions 32, 32 are each provided with a longitudinal slot 34 which receives a pivot 35, the pivots 35 for each of the leg portions of the yoke being axially aligned and extending in a horizontal direction transversely of the steering column. Pivots 35, 35 are supported from the hood cowl portion by brackets 36, 36.

The cowl portion 11 of the steering column is provided with a fore and aft extending slot 37 for receiving and permitting swinging movemnt of the steering column housing 11 between the broken line and full line positions indicated in FIGURE 2. Preferably, the slot may be faced with a rubber-like liner 39 having flaps 40 tending to close the slot 37 behind the steering column as it is swung from one position to the other.

A pair of flanges 41, 41 extend downwardly in a generally vertical plane within the cowl portion 11 from the two longitudinal edges of the slot 37, the flanges having an arcuate edge extending about the axis of the pivots 35 as a center. Notches 42 are provided in the lower edge of each of the flanges 41 to receive bosses 44, 44, one boss being located on each side of the yoke 31 and preferably having a conical contour to wedge within the notches 42 and avoid rattles. Preferably, two notches 42 are provided in each flange 41, each notch establishing a position of the steering column.

The yoke 31 is urged upwardly at all times so as to press the bosses 44 into the notches 42 by a pair of springs 45, 45, one spring extending between each yoke pivot 35 and a spring retainer 46 located at the lower ends of the leg portions 32 of the yoke. The organization is such that whenever the bosses 44 are received within one of the sets of notches 42, the steering column is locked against movement.

To move the steering wheel 14 from one of the positions shown in FIGURE 1 to the other, the steering wheel is forced axially downwardly, depressing the yoke 31 on the pivots 35, 35 and stretching the springs 45, 45. The yoke universal joint 26 and shafts 24 and 25 move downwardly, the splined lower end of shaft 24 telescoping in universal joint 29. With the yoke 31 depressed, the bosses 44, 44 are removed from one set of notches 42 and the steering wheel and upper post of the steering column may be moved to the other position shown in FIGURE 1 and the wheel permitted to rise axially, the yoke 31 rising and the bosses 44, 44 entering the other set of notches 42. The ends of the slot in the tractor cowl portion 11 limit movement of the steering wheel and column in both directions.

We claim:

1. In a tractor, an upwardly, rearwardly inclined steering shaft, a steering wheel on the upper end of the shaft, bearing means rotatably receiving the steering shaft, means for providing a transverse, horizontal pivot axis about which the bearing means and steering shaft are adapted to be swung through an arc extending in a vertical plane perpendicular to the pivot axis of the bearing means, a spring biasing the bearing means in a direction genrally axially of the upper portion of the steering shaft, a fixed member extending along an arc about the axis of the bearing means as a center and having portions interfitting with portions of the bearing means to lock said bearing means against swinging movement, the bearing means being displaceable by axial movement of the steering wheel and upper portion of the steering shaft to release the interfitting portions of the bearing means and member, the steering shaft being swingable about the axis of the bearing means to a second position.

2. In a tractor, an upwardly, rearwardly inclined steering shaft, a steering wheel on the upper end of the shaft, a universal joint intermediate the ends of the steering shaft permitting the upper portion of the shaft to be swung to a position angled with respect to the lower portion thereof, a yoke rotatably receiving the upper portion of the steering shaft, means for providing a transverse, horizontal pivot axis about which the yoke and upper portion of the steering shaft are adapted to swing through an arc extending in a vertical plane perpendicular to the axis of the yoke, the yoke being slotted to receive the pivot axis, spring means to bias the yoke in a direction generally axially of the upper portion of the steering shaft, a fixed member extending along an arc about the axis of the yoke as a center and having a pair of spaced depressions into which a portion of the yoke is adapted to be biased by the spring means, the yoke being displaceable by axial movement of the upper portion of the steering shaft to remove the portion of the yoke from one of the depressions, and the yoke and upper portion of the steering shaft being swingable about the axis of said portion of the yoke to engage the yoke in the other depression.

3. In a tractor having an upwardly, rearwardly inclined steering shaft, a steering wheel on the upper end of the steering shaft, a universal joint permitting the upper portion of the shaft to be swung to a position angled with respect to the lower portion thereof, means providing a transverse, horizontal pivot axis about which the upper portion of the steering shaft is adapted to swing along a vertical arc, the steering wheel and upper portion of the steering shaft being axially movable and biased in one direction of said movement, guide means for limiting the vertical arc through which the steering shaft may be swung, and means carried by the upper portion of the steering shaft for latching it in a fixed position at each end of said vertical arc, movement of the steering wheel and upper portion of the steering shaft against its bias unlatching the shaft for swinging movement.

References Cited by the Examiner
UNITED STATES PATENTS

| 788,852 | 5/05 | Sechand | 74—484 |
| 912,215 | 2/09 | Warren | 74—492 X |
| 1,025,215 | 5/12 | Stull | 74—493 |
| 1,048,748 | 12/12 | Seaman | 74—493 |
| 2,770,981 | 11/56 | Fieber | 74—493 |
| 2,830,464 | 4/58 | Winterbauer. | |

FOREIGN PATENTS

| 11,175 | 1914 | Great Britain. |
| 292,301 | 6/28 | Great Britain |
| 737,959 | 10/55 | Great Britain. |
| 804,830 | 11/58 | Great Britain. |

BROUGHTON G. DURHAM, *Primary Examiner.*

DON A. WAITE, *Examiner.*